(12) United States Patent
Burger et al.

(10) Patent No.: US 10,823,606 B2
(45) Date of Patent: Nov. 3, 2020

(54) OPTOELECTRONIC APPARATUS

(71) Applicant: Vishay Semiconductor GmbH, Heilbronn (DE)

(72) Inventors: Daniel Burger, Leingarten (DE); Sascha Kuhn, Oedheim (DE); Peter Mühleck, Offenau (DE)

(73) Assignee: VISHAY SEMICONDUCTOR GMBH, Heilbronn (DE)

( * ) Notice: Subject to any disclaimer, the term of this patent is extended or adjusted under 35 U.S.C. 154(b) by 102 days.

(21) Appl. No.: 16/078,514

(22) PCT Filed: Feb. 22, 2017

(86) PCT No.: PCT/EP2017/054078
§ 371 (c)(1),
(2) Date: Aug. 21, 2018

(87) PCT Pub. No.: WO2017/144540
PCT Pub. Date: Aug. 31, 2017

(65) Prior Publication Data
US 2019/0056263 A1 Feb. 21, 2019

(30) Foreign Application Priority Data

Feb. 23, 2016 (DE) .......................... 10 2016 103 144

(51) Int. Cl.
*G01J 1/02* (2006.01)
*G01S 7/497* (2006.01)
(Continued)

(52) U.S. Cl.
CPC ........... *G01J 1/0242* (2013.01); *G01J 1/0228* (2013.01); *G01J 1/0295* (2013.01); *G01S 7/481* (2013.01);
(Continued)

(58) Field of Classification Search
CPC ...... G01J 1/0242; G01J 1/0228; G01J 1/0295; G01S 17/04; G01S 7/481; G01S 7/497; G01S 7/4813; G01S 17/08
(Continued)

(56) References Cited

U.S. PATENT DOCUMENTS 5,719,965 A * 2/1998 Degi ...................... H04N 1/407
  348/674
5,920,407 A * 7/1999 Erickson .............. H04N 1/6027
  358/504

(Continued)

FOREIGN PATENT DOCUMENTS

DE  19933924 A1  11/2000
DE  102008030518 A1  12/2009
(Continued)

OTHER PUBLICATIONS

Lee S et al: "Implementation and Evaluation of HexEYE: A Dibstributed Optical Proximity Sensor System." IEEE International Conference on Robotics and Automation. May 21, 1995.

*Primary Examiner* — Seung C Sohn
(74) *Attorney, Agent, or Firm* — Volpe Koenig (57) ABSTRACT

An optoelectronic apparatus is provided that has at least one optoelectronic transmitter and at least one optoelectronic receiver. The optoelectronic apparatus furthermore has a storage device having at least one non-volatile memory that is adapted to store an individual data set. A data interface is furthermore provided that is adapted to at least partly read the individual data set out of the non-volatile memory of the storage device.

21 Claims, 7 Drawing Sheets

(51) Int. Cl.
  *G01S 7/481* (2006.01)
  *G01S 17/04* (2020.01)

(52) U.S. Cl.
  CPC .............. *G01S 7/497* (2013.01); *G01S 17/04* (2020.01); *G01S 7/4813* (2013.01)

(58) Field of Classification Search
  USPC ......................................... 250/214 DC, 239
  See application file for complete search history.

(56) References Cited

U.S. PATENT DOCUMENTS

| | | | |
|---|---|---|---|
| 6,489,992 B2* | 12/2002 | Savoye ................... | H04N 5/20 348/340 |
| 7,705,293 B2* | 4/2010 | Miyahara ................ | B41J 2/125 250/239 |
| 9,185,256 B2* | 11/2015 | Sato ................... | H04N 1/40056 |
| 2003/0019253 A1 | 1/2003 | Lorenz et al. | |
| 2011/0121182 A1 | 5/2011 | Wong et al. | |
| 2011/0248151 A1 | 10/2011 | Holcombe et al. | |
| 2012/0292660 A1 | 11/2012 | Kanno | |
| 2013/0049641 A1 | 2/2013 | Sheynblat et al. | |
| 2015/0122993 A1* | 5/2015 | Noji ..................... | G01N 23/225 250/307 |
| 2015/0226839 A1 | 8/2015 | Brandl et al. | |

FOREIGN PATENT DOCUMENTS

| | | |
|---|---|---|
| DE | 202009003002 U1 | 8/2010 |
| DE | 102012016266 A1 | 2/2013 |

\* cited by examiner

OPTOELECTRONIC APPARATUS

CROSS REFERENCE TO RELATED APPLICATION(S)

This application is a § 371 application of International Application No. PCT/EP2017/054078, filed Feb. 22, 2017, which is incorporated by reference as if fully set forth.

FIELD OF INVENTION

The present invention relates to an optoelectronic apparatus having at least one optoelectronic transmitter and at least one optoelectronic receiver. The optoelectronic transmitter and the optoelectronic receiver can, for example, be installed on a carrier device of the optoelectronic apparatus.

BACKGROUND

A lens element that has at least one lens section for the optoelectronic transmitter and/or for the optoelectronic receiver can be provided above the carrier device, i.e. above the optoelectronic transmitter and/or the receiver with respect to a vertical direction. For this purpose, the respective lens section can have beam-shaping and/or beam-deflecting properties.

Such optoelectronic apparatus are in particular configured as optoelectronic sensor apparatus to be able to optically scan and electronically detect properties of objects. An application for such sensor apparatus is in the sector of commercially available printer devices, i.e. apparatus for a computer-assisted printing of paper by means of known printing technologies, e.g. laser printing technology or ink-jet printing technology. To allow an operation of a printer (or of a multifunctional device comprising a printer) that is as fully automatic and as user-friendly as possible, different operating parameters of the printer such as a quantity or a type of the paper placed into the reception tray of the printer, a provided paper format, the relative position of a paper edge and the like are determined and are monitored as necessary. There is furthermore a need for an automatic analysis of a respective print result or of a paper to be scanned in order e.g. to check the content type (image vs. text) of the paper to be scanned or the correct configuration (e.g. mechanical alignment of a printing unit of the printer) with reference to a print result.

An adapted optoelectronic apparatus is typically provided for each operating parameter to be measured and is configured to compare an emitted optical signal with a detected, e.g. reflected, optical signal to be able to determine the respective operating parameter from the difference of these optical signals. The optical signals are generally electromagnetic radiation of a visible or non-visible wavelength, in particular infrared. The apparatus frequently comprises both an optoelectronic transmitter and an optoelectronic receiver. The apparatus can thus, for example, act as a proximity sensor. Variants are, however, also possible in which an optoelectronic apparatus has a plurality of transmitters and receivers, with an apparatus e.g. being able to determine a plurality of operating parameters, in particular simultaneously, (e.g. by a distinction between diffuse and specular reflection). A respective received signal of the optoelectronic receiver can—optionally after a processing such as an analog-to-digital conversion—be output as an output signal of the optoelectronic apparatus.

A problem of such optoelectronic apparatus as a rule comprises an error-free and precise function of such an apparatus not being able to be guaranteed equally, e.g. not in every application case, under all circumstances. One reason for this is in particular manufacture-induced tolerances of those components that underlie a respective optoelectronic apparatus. This, on the one hand, relates to the mechanical components of the apparatus such as a lens element or an aperture element. On the other hand, electronic components of the apparatus, in particular the optoelectronic transmitter and the optoelectronic receiver, can also deviate from a desired specification. It is generally not possible to predict whether a deviation from the specification actually produces a malfunction of the optoelectronic apparatus since a malfunction depends, on the one hand, on the kind and on the degree of the deviation and, on the other hand, on the application case of the optoelectronic apparatus. For example, a deviation can only have an effect in an application of the apparatus for a detection of objects comparatively far away (e.g. greater than 10 cm) and can only then produce an unreliable or a completely defective function of the apparatus. Near objects may in contrast be detected without problem. The function of the apparatus can in particular also be influenced by the measurement environment of the apparatus within the framework of a specific application. It is furthermore not predictable in individual cases whether and if so, how specification deviations influence one another. It is thus as a rule not possible to assume a linear superposition of individual deviations. Serious, i.e. non-linear, effects are rather possible that result from a plurality of only slight deviations.

Parts of the apparatus that deviate from their specification to a certain degree or the total apparatus have/has to be discarded as rejects as a rule due to the above-described problems. Since deviations from the specification can, however, at least generally not be completely avoided within the framework of a manner of industrial mass production, a certain risk of a malfunction or of a limited precision of the apparatus customarily always has to be accepted. Whether one or more parts of an optoelectronic apparatus actually have to be discarded can naturally be checked within the framework of a test cycle that is in particular specific to an application. The universal applicability of the apparatus is, however, hereby lost since the apparatus can at best be checked for a few applications with a justifiable effort. It is also problematic that the underlying conditions of a test cycle that may still be substantially correct with a just manufactured apparatus can vary in the course of practical operation and can thus impair the function of the apparatus in an unpredictable manner. In the event of an application of the apparatus in a printer, aerosols, paper dust and the like can, for example, collect at the apparatus over time and can thus significantly change the optical properties.

SUMMARY

It is an object of the invention to provide an inexpensive optoelectronic apparatus of the initially named kind in which a precise and reliable function can be ensured and malfunctions can be prevented and can in particular be simply corrected retroactively. It is furthermore an object of the invention that apparatus that differ, in particular substantially, from an underlying specification can nevertheless be used, i.e. do not have to be discarded.

The object is satisfied by an optoelectronic apparatus having the features of claim 1 and in particular in that the optoelectronic apparatus comprises a storage device having at least one non-volatile memory that is adapted to store an individual data set. A data interface is furthermore provided that allows an access to the non-volatile memory, in particular from outside the optoelectronic apparatus.

The individual data set can comprise a plurality of individual data that relate to the specific optoelectronic apparatus in whose storage device the respective data set is stored. In other words, the data set represents a specific optoelectronic apparatus or its specific properties. It can in this respect be a specific type of apparatus. The individual data set can, however, also only relate to a specific example of an apparatus type. The data set is at least not generally valid for a number of apparatus, e.g. independently of the type, but rather has a specific relation to an individual optoelectronic apparatus. This is, however, not countered by the fact that the individual data sets of different optoelectronic apparatus can at least partly coincide with one another.

The individual data set can comprise operating parameters that are relevant to the operation of the apparatus. They can be read out of the non-volatile memory and taken into account as part of an operation of the apparatus in accordance with the application. In particular a defective control of the optoelectronic apparatus can hereby be avoided. For example, an overload of the optoelectronic components (transmitter/receiver) can be precluded by predefining one or more limit values, in particular maximum values. It is furthermore conceivable that the individual data set contains information on individual deviations of the optoelectronic components or of other components of the apparatus. For example, it can be predefined by the individual data set that the optoelectronic transmitter has to be controlled with a predefined offset to generate a specified emission signal. The reliability and precision of the apparatus can thus be increased overall.

The term "operating parameters" is not to be understood as only scalar values. For instance, operating ranges or working ranges that comprise a plurality of characteristic values can in particular also be operating parameters in the sense of the invention. Calibration factors of the optoelectronic apparatus that were e.g. determined as part of a test cycle of the apparatus, can equally be operating parameters. The term "operating parameters" is thus to be understood broadly within the framework of the invention.

The non-volatile memory can, for example, be configured as a flash memory. The actually used memory size can be adapted to the volume of the individual data set or to the volumes of the data sets to be expected. The non-volatile memory can be comparatively large for this purpose, e.g. 128 bytes. The memory can thus record data sets of different sizes in a flexible manner without the memory size representing a relevant limitation that has to be taken into account in the definition of a respective data set under normal circumstances. The non-volatile memory is preferably rewritable, i.e. can be written multiple times. The stored individual data set can hereby also be retroactively changed or adapted, in particular only after an original saving of the individual data set by the manufacturer and in particular on the basis of a self-diagnosis or by the user. The rewriting of the non-volatile memory from external can in particular take place via the data interface.

The individual data set or parts thereof can be directly or indirectly read out of the non-volatile memory via the data interface. This can take place at the start of an operation of the optoelectronic apparatus or during the ongoing operation as required, at regular intervals and/or in dependence on the operation (e.g. triggered by a predefined effort). The individual data set can in particular supplement or replace a configuration of the optoelectronic apparatus. The data interface can in particular be a data bus interface, i.e. an interface of a communication bus that preferably communicates in accordance with a standardized protocol.

In an exemplary application of the optoelectronic apparatus in a printer, a test signal can be transmitted by the optoelectronic transmitter, for example, on every putting into operation of the printer, and a received signal dependent thereon can be received by the optoelectronic receiver. One or more operating parameters of the individual data set can be adapted to the current measurement environment and to the condition of the apparatus by a comparison of the received signal with stored reference values.

In accordance with an embodiment, the individual data set represents a spectral sensitivity characteristic, i.e. a frequency-specific or wavelength-specific characteristic, of the optoelectronic apparatus. The sensitivity characteristic in this respect e.g. relates to the spectral sensitivity of the optoelectronic receiver with respect to incident optical signals. A sensitivity characteristic can additionally or alternatively also be a distance dependency and/or an angular dependency. In this respect, the individual data set can therefore e.g. deliver information on how the optoelectronic receiver behaves in the course of a detection of objects at different distances or with respect to the angle of incidence of arriving optical signals.

In accordance with a further embodiment, the individual data set comprises identification data on a production history of the optoelectronic apparatus, with the identification data comprising at least one part number, at least one lot number and/or at least one piece of information on a production time.

Additionally or alternatively, the individual data set comprises production process data on a production history of the optoelectronic apparatus, with the production process data comprising at least one piece of information on a tool used in the manufacture, at least one piece of information on a test device used in the manufacture and/or at least one piece of information on test software used in the manufacture. The production process data allow a diagnosis of malfunctions or of other defects of the apparatus, wherein a respective defect can, in particular when it is a new occurrence or when it occurs in an unpredicted manner, be traced back in dependence on the production process data or can be put into relation with a manufacture-induced reason that has led to this defect. This information can also be particularly important when firmware of the optoelectronic apparatus and/or specific calibration data within the individual data set are to be updated as part of an update since then the update can be selected in dependence on the individual production history of the optoelectronic apparatus. It can, for example, hereby be taken into account that only the firmware or the calibration data of those optoelectronic apparatus have to be updated that were machined with a specific tool during the manufacture.

In accordance with a further embodiment, the individual data set comprises at least one transfer function, with the transfer function describing a relationship between at least one first operating parameter and at least one second operating parameter of the optoelectronic apparatus. In this respect, the transfer function can in particular relate to a predefined use of the optoelectronic apparatus as a sensor (e.g. for determining an object distance). An application-specific calibration of the optoelectronic apparatus is not necessary when using the stored transfer function, in particular when the respective optoelectronic apparatus has been installed in accordance with its intended purpose, e.g. in a printer. In other words, the data required for calibrating the apparatus only have to be determined once, in particular by the manufacturer of the apparatus, with the data then being provided to the customer or to the user of the apparatus directly in the non-volatile memory. The customer or the user can then read out the data and use them for an application-specific adaptation of the measured data. The stored data of the transfer function can, however, be updated or supplemented as required.

The transfer function can in particular represent individual optical and/or electronic properties of the respective apparatus and the application-specific behavior of the apparatus. The transfer function can, for example, describe the relative intensity of an optical signal received by the optoelectronic receiver in dependence on a distance of an object from which the optical signal originated or was reflected. Such a transfer function can in particular be used on a use of the optoelectronic apparatus as a distance sensor, in particular as a paper quantity sensor in a printer. It is possible to draw a conclusion on the object distance or on the paper quantity from an intensity value of the receiver on the basis of such a transfer function. Since the transfer function relates to the individual apparatus, the association can also take place precisely when the apparatus per se deviates from a predefined specification, i.e. the desired function of the apparatus is nevertheless ensured. The transfer function can thus serve to compensate the individuality of the apparatus or the variation between individual apparatus in an electronic manner so that the apparatus can satisfy a predefined uniform function, i.e. a function not individual to an apparatus, while taking account of the transfer function.

It is understood that a respective associated transfer function can be provided for a respective working point or operating point or for a working range or operating range of the apparatus. A transfer function can therefore be both application-specific in the sense of an application mode of the apparatus (e.g. as a paper quantity sensor) and application-specific in the sense of operating conditions or operating modes of the apparatus (e.g. environmental luminosity or object distance range). Furthermore, specific values of operating parameters such as an amplification factor can be predefined for the optoelectronic transmitter or receiver for a respective transfer function.

The first operating parameter of the transfer function can in particular correspond to a ratio of a received signal of the optoelectronic receiver to an emission signal of the optoelectronic transmitter. The first operating parameter therefore does not have to be identical with a directly measured size of an optoelectronic component, but can rather be a size derived therefrom or a combination of a plurality of measure sizes and/or operating parameters. The first operating parameter is preferably measured by an electrical voltage or by an electrical current of a photosensitive element of the optoelectronic receiver, with the measured voltage or the measured current being put into relation with a voltage or with a current by which the optoelectronic transmitter was controlled to transmit the respective emission signal.

The transfer function does not only have to describe a relationship between two operating parameters. The transfer function can also comprise more than two function variables. It can, for example, be a parameter function in which a two-dimensional transfer function has a relationship with a higher-ranking operating parameter (e.g. an object type or a printer type).

As part of a use of the optoelectronic apparatus in a printer, an operating parameter can in particular be the relative position of a paper edge of a sheet of paper arranged in the printer. The (correct) position of the sheet of paper can be determined on the basis of the relative intensity of a detection signal received by the optoelectronic receiver. It can, for example, be monitored whether a front edge of the sheet of paper adopts a predefined position or not. The individual data set can comprise switching points adapted hereto or can allow the adaptation of switching points to a transfer function, with a switching point determining the intensity of the received signal from which it is assumed that the edge of the sheet of paper adopts the predefined position. Conventionally, such switching points were fixedly programmed independently of the actual transfer function of the electronic apparatus or have to be determined at great effort within the framework of a calibration process at the customer's or at a user's.

In accordance with an embodiment, the individual data set has a look-up table for describing the at least one transfer function and/or polynomial parameters for characterizing a polynomial function. A look-up table is a look-table of two dimensions or of more dimensions that, for at least one operating parameter (as a reference value or input value), provides at least one operating parameter (as an output value), with intermediate values being able to be determined by interpolation as required. A polynomial function describes the dependency of a second operating parameter (as an output value) of at least one first operating parameter (as a reference value or input value). The polynomial parameters of the individual data set can characterize a predefined polynomial function or fix one of a plurality of different polynomial functions and characterize them. An advantage of the look-up table or of the polynomial parameters for a polynomial function comprises the small requirement for memory space. Operating parameter value are furthermore available fast since they do not have to be separately calculated or can be calculated with only a little effort. A retroactive adaptation of the transfer function is furthermore possible in a simple manner, in particular when it is represented by a polynomial function, e.g. by adapting one or more polynomial parameters.

In accordance with a preferred embodiment, the apparatus has an application-specific integrated circuit (ASIC), with the storage device being connected to the application-specific integrated circuit or being integrated in the application-specific integrated circuit.

The use of an ASIC offers a number of advantages. One advantage is that the optoelectronic transmitter and receiver can be controlled directly by the (local) ASIC. In comparison with the case of a direct control from external or remotely, e.g. by a connected microcontroller, a better signal-to-noise ratio (SNR) of the optoelectronic apparatus can hereby be achieved so that the optoelectronic apparatus can be operated efficiently and at a higher precision and reliability. The ASIC can nevertheless have a very simple and inexpensive structure. Such ASICS are in particular available in large volumes at a favorable cost.

The optoelectronic apparatus can be equipped with an intelligence by the ASIC that was previously not possible with regard to the manufacturing costs. The non-volatile memory has proven to be particularly advantageous in this respect since the ASIC allows an operation, in particular an ideal operation, tailored to the individual apparatus beyond the mere application-specific circuit design of the ASIC. The data interface provided to read out the memory is preferably integrated into the ASIC so that the ASIC can internally write and read the memory, with the corresponding data being able to be transferred e.g. via a bus module of the ASIC between the ASIC and a higher ranking external control unit (e.g. a microcontroller). It is also conceivable to provide a separate data interface for the memory so that data can be written from the ASIC into the memory or can be read out of it. This is naturally also the case when no ASIC is provided.

A preprocessing of the control signals provided for the optoelectronic transmitter can take place by the ASIC. A preprocessing of optical signals received by the optoelectronic receiver is furthermore conceivable. In accordance with an advantageous embodiment, the ASIC can in this respect make use of the stored individual data set and can, for example, take account of individual amplification factors. It is furthermore conceivable that the ASIC determines an update requirement of the individual data set and communicates this to the control unit as part of a regular test cycle and/or in coordination with a higher ranking control unit of the apparatus.

In accordance with an embodiment, the application-specific integrated circuit can be adapted to process (e.g. to digitize) received signals of the optoelectronic receiver and to output them in the processed form as output signals of the optoelectronic apparatus via the data interface or via a bus module, wherein the application-specific integrated circuit can furthermore be adapted to read the individual data set or parts thereof out of the non-volatile memory and to output them (in addition to the processed received signals) via the data interface. In accordance with an advantageous embodiment, the application-specific integrated circuit is, however, in this respect not suited to process the received signals of the optoelectronic receiver in dependence on the stored individual data set. This relatively complex calculation effort can be carried out by an external signal processing unit (microcontroller) that is anyway present in most applications. In this embodiment of the optoelectronic apparatus, a comparatively simply designed ASIC with a low processing power can thus be provided.

In accordance with a further embodiment, the optoelectronic apparatus comprises a temperature sensor. The temperature measured within the optoelectronic apparatus or of the direct environment by means of the temperature sensor can hereby be considered as an operating parameter such that in the case of a temperature-dependent function of the apparatus, it can nevertheless be operated according to specification. A temperature-dependent measurement deviation can, for example, be directly compensated, in particular by an external microcontroller connected to the apparatus. The knowledge required for this can be stored with the individual data set in the non-volatile memory of the storage device and can e.g. be available to the control unit or to the microcontroller of the apparatus after reading out the data set.

The invention further relates to a method of manufacturing an optoelectronic apparatus in accordance with any one of the above-described embodiment variants, wherein a spectral sensitivity characteristic, a distance-dependent sensitivity characteristic and/or an angle-dependent sensitivity characteristic of an optoelectronic apparatus is determined. The individual data set is written into the non-volatile memory of the storage device in dependence on the measured results, with the individual data set representing the determined sensitivity characteristic. The determination or check of the sensitivity characteristic can in particular take place as part of a test cycle of the optoelectronic apparatus at the manufacturer's of the apparatus—that is as part of the production process—and/or at a customer's or user's of the apparatus (e.g. at the manufacturer's of a printer).

The invention furthermore relates to a method of manufacturing an optoelectronic apparatus in accordance with any one of the above-described embodiment variants, wherein the optoelectronic apparatus is manufactured and tested in accordance with a production process, and wherein, in dependence on the production process, an individual data set is written to the non-volatile memory of the storage device that comprises at least one piece of information on a tool used in the manufacture, at least one piece of information on a test device used in the manufacture and/or at least one piece of information on test software used in the manufacture. The stored data are in particular directly available to the customer or user of the apparatus and can generally serve as an "electronic ID" of the apparatus or for the diagnosis of malfunctions of the apparatus that occur. An end user of the apparatus can also profit from the stored data, e.g. in that required updates do not have to be manually located, but can rather be carried out automatically on the basis of the individual data set.

The invention furthermore relates to a method of reading an individual data set out of an optoelectronic apparatus in accordance with any one of the above-described embodiment variants, wherein the individual data set is at least partly read—directly or indirectly—out of the non-volatile memory of the storage device of the apparatus via the data interface of the optoelectronic apparatus. The individual data set can in particular be read out by firmware for a reliable and precise operation of the (individual) apparatus.

The invention furthermore relates to a method of operating an optoelectronic apparatus in accordance with any one of the above-described embodiment variants, wherein the individual data set of the optoelectronic apparatus is at least partly read out of the non-volatile memory of the storage device via the data interface of the optoelectronic apparatus, and wherein the optoelectronic apparatus is operated in dependence on the read out individual data set.

The read out individual data set can comprise at least one transfer function that describes a relationship between at least one first operating parameter and at least one second operating parameter, wherein the transfer function preferably relates to a predefined use of the optoelectronic apparatus as a sensor.

In accordance with an embodiment of the method, the read out individual data set is checked for a update requirement. If an update requirement of the individual data set stored in the non-volatile memory of the storage device is found, it is accordingly updated via the data interface of the optoelectronic apparatus.

BRIEF DESCRIPTION OF THE DRAWING(S)

The invention will be explained in the following only by way of example with reference to the drawings, in which.

DETAILED DESCRIPTION OF THE PREFERRED EMBODIMENT(S)

The same or similar elements in the drawings are marked by the same reference numerals.

An optoelectronic apparatus 10 comprises a carrier device 12, an aperture element 14, a lens element 16 and a holding device comprising a lower part 18 and an upper part 20. All of these components are shown obliquely from above in FIG. 1, i.e. the perspective is directed obliquely to a respective upper side of the components. The components 12, 14, 16, 18 and 20 are assembled in a sandwich arrangement so that the condition of the apparatus 10 shown in FIG. 2 results.

Figure 1:
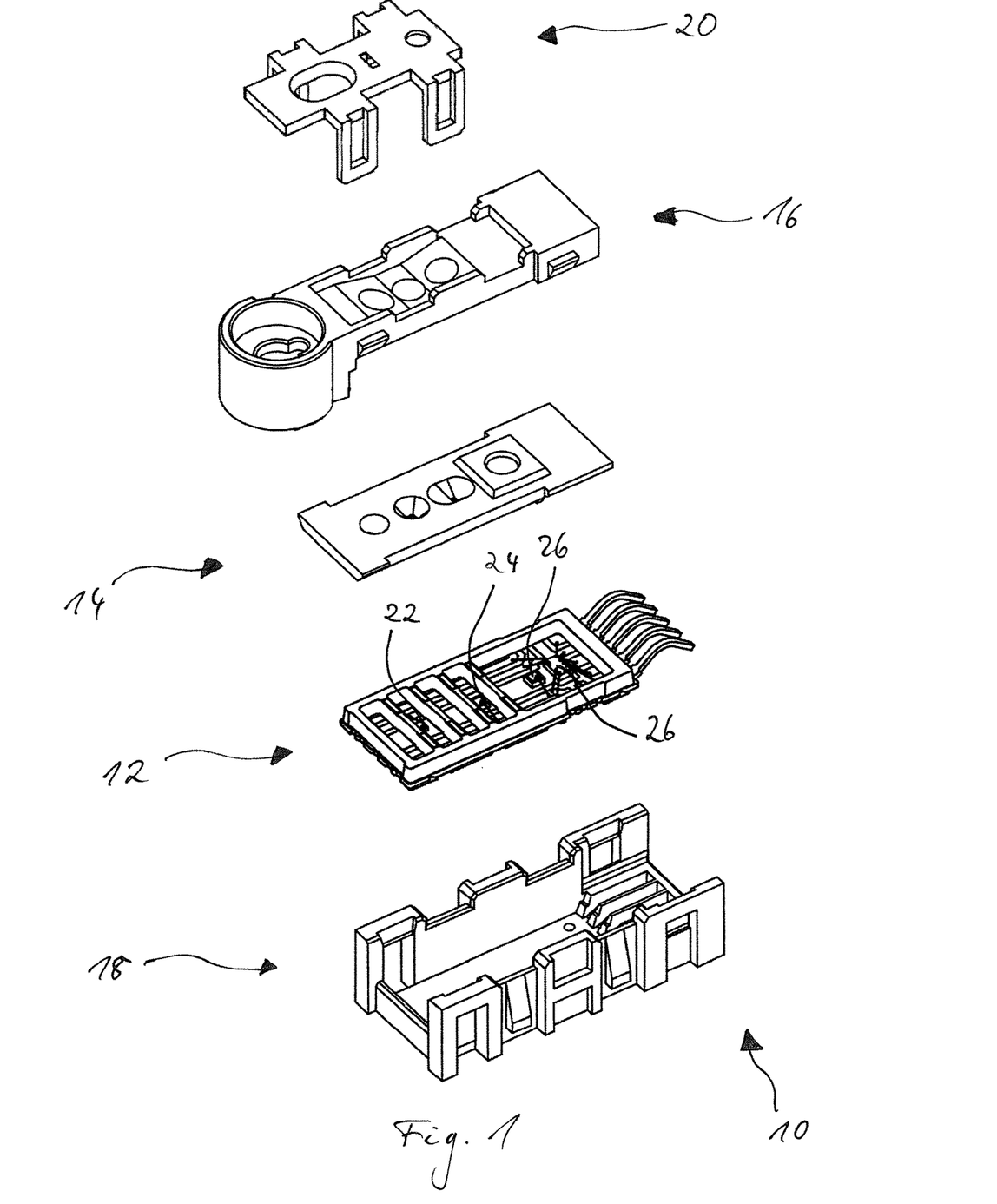
FIG. 1 is an exploded representation of an optoelectronic apparatus.
Figure 2:
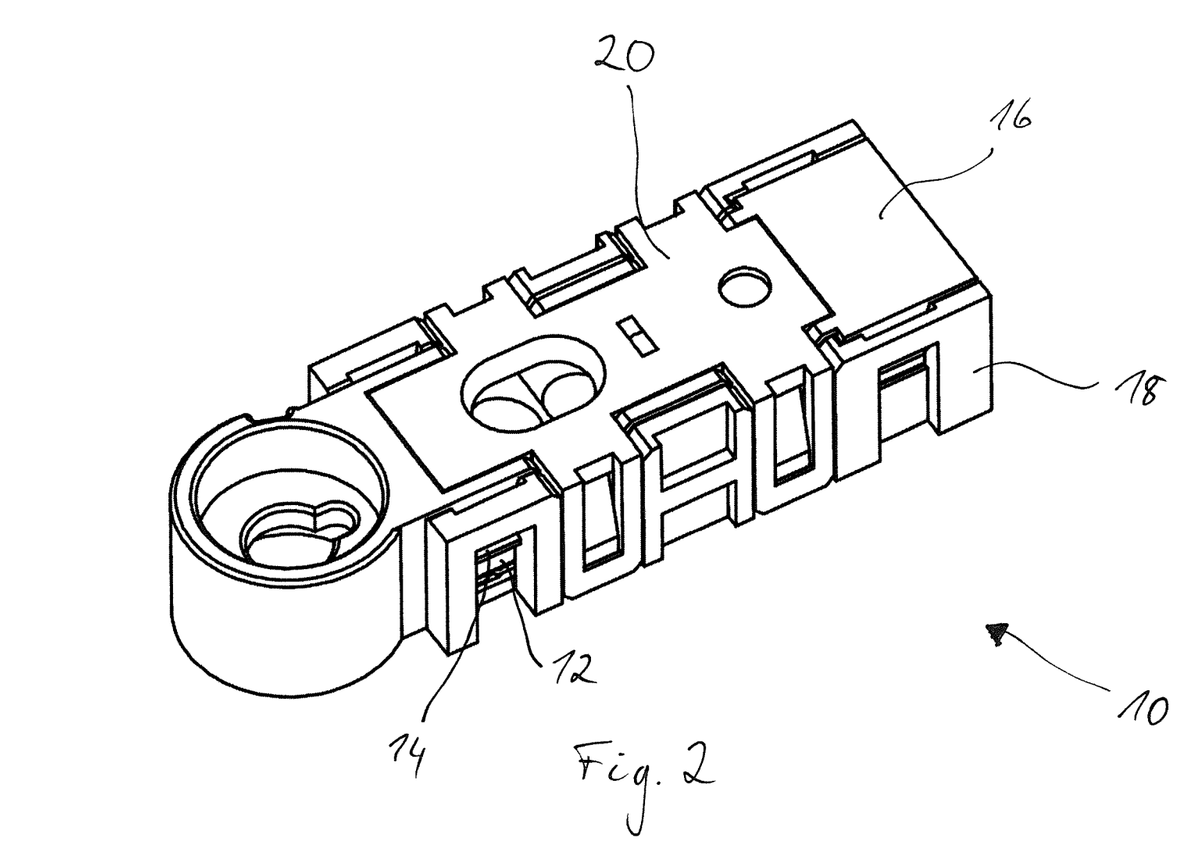
FIG. 2 is a representation of the apparatus of FIG. 1 in an assembled state.

One optoelectronic transmitter 22 and two optoelectronic receivers 24 are, for example, installed on the carrier device 12. An application-specific integrated circuit (ASIC) 26 is furthermore installed on the carrier device 12.

Figure 3:
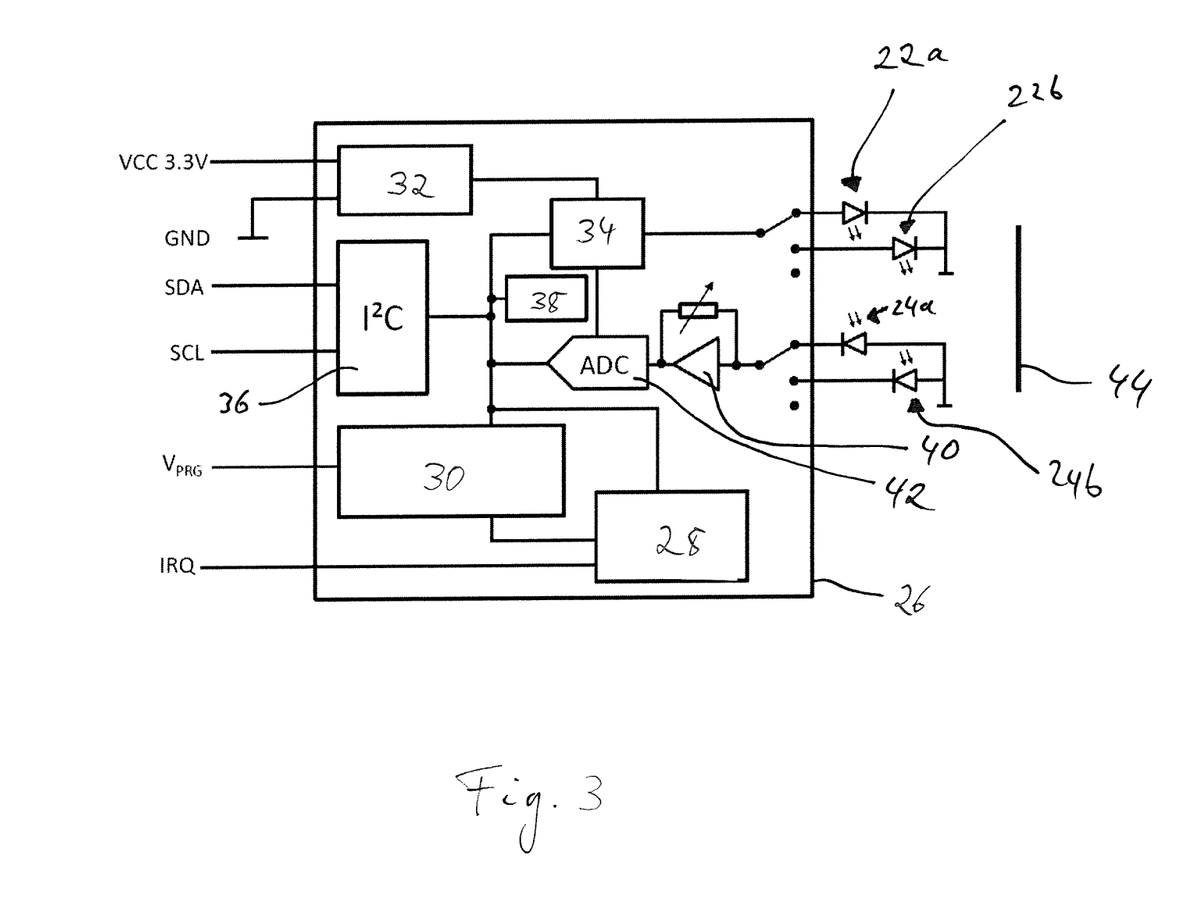
FIG. 3 is a schematic diagram of an electronic circuit of an optoelectronic apparatus.

A simplified circuit diagram is shown in FIG. 3 that shows details of the ASICs 26. The ASIC 26 comprises a logical processing unit 28 and a storage device with a non-volatile memory 30. The ASIC 26 furthermore comprises a voltage regulation 32, a power source 34, a bus module 36 (for example an inter-integrated circuit (I2C), a temperature sensor 38, a signal amplifier 40, and an analog-to-digital converter 42. The bus module provides an interface at a speed of e.g. 1 Mbit per second. The power source 34 is preferably bidirectional and has a resolution of e.g. 10 bits. The power source 34 can furthermore be programmed with respect to four output current ranges from +/−25 mA up to +/−200 mA so that a 12 bit power source effectively results. The analog-to-digital converter 42 can be selectively set with respect to its resolution and speed in dependence on a respective use of the apparatus 10. It is thus possible in a plurality of setting stages to select between a fast conversion at low resolution (e.g. 10 µs and 6 bits) and a slow conversion at a high resolution (e.g. 12.8 ms and 16 bits). The ASIC 26 is preferably operated with DC current so that the respective apparatus 10 is in particular suitable for scan applications or time-critical (fast) applications.

The ASIC in the embodiment shown here is connected to two optoelectronic transmitters 22a, 22b configured as a respective light emitting diode and to two optoelectronic receivers 24a, 24b configured as a respective photodiode. Unlike the carrier device 12 of FIG. 1, two respective transmitters 22 and receivers 24 are thus installed on the carrier device 12 underlying the ASIC 26 of FIG. 3. The transmitters 22 and receivers 24 can be selectively set with respect to a respective amplification factor.

The voltage regulation 32 is connected to a direct voltage source ("VCC 3.3V") and to ground ("GND"). The bus module 36 is connected to a data line ("SDA") and to a clock line ("SCL") The bus module 36 serves as a data interface of the apparatus 10 so that the apparatus 10 can e.g. communicate with an external microcontroller (not shown). Output signals of the optoelectronic apparatus 10 can be output (in dependence on received signals of the optoelectronic receivers 24a, 24b) via the interface formed by the bus module 36. It is furthermore possible to access the non-volatile memory 30 from external via this interface. The non-volatile memory 30 allows an additional programming function via a separate voltage input ("VPRG"). The logical unit 28 is furthermore connected to a line for transferring a so-called interrupt request ("IRQ"), in particular to the named microcontroller.

An individual data set is stored in the non-volatile memory 30 of the ASIC 26 and comprises at least one transfer function of the optoelectronic apparatus 10, with the individual data set relating to the specific optoelectronic apparatus 10 that bears the memory 30 having the individual data set. A transfer function of the individual data set can characterize a detection of an object 44 (e.g. of a sheet of paper) by means of the optoelectronic transmitter 22a and of the optoelectronic receiver 24a. A further transfer function of the individual data set can characterize a detection of a further object (not shown) by means of the optoelectronic transmitter 22b and of the optoelectronic receiver 24b. The individual data set can be fully or partly (e.g. only one of the transfer functions) read out of the memory 30 so that the optoelectronic apparatus 10 can be reliably operated as a sensor in accordance with a uniform specification while taking account of the individual data set.

Figure 4:
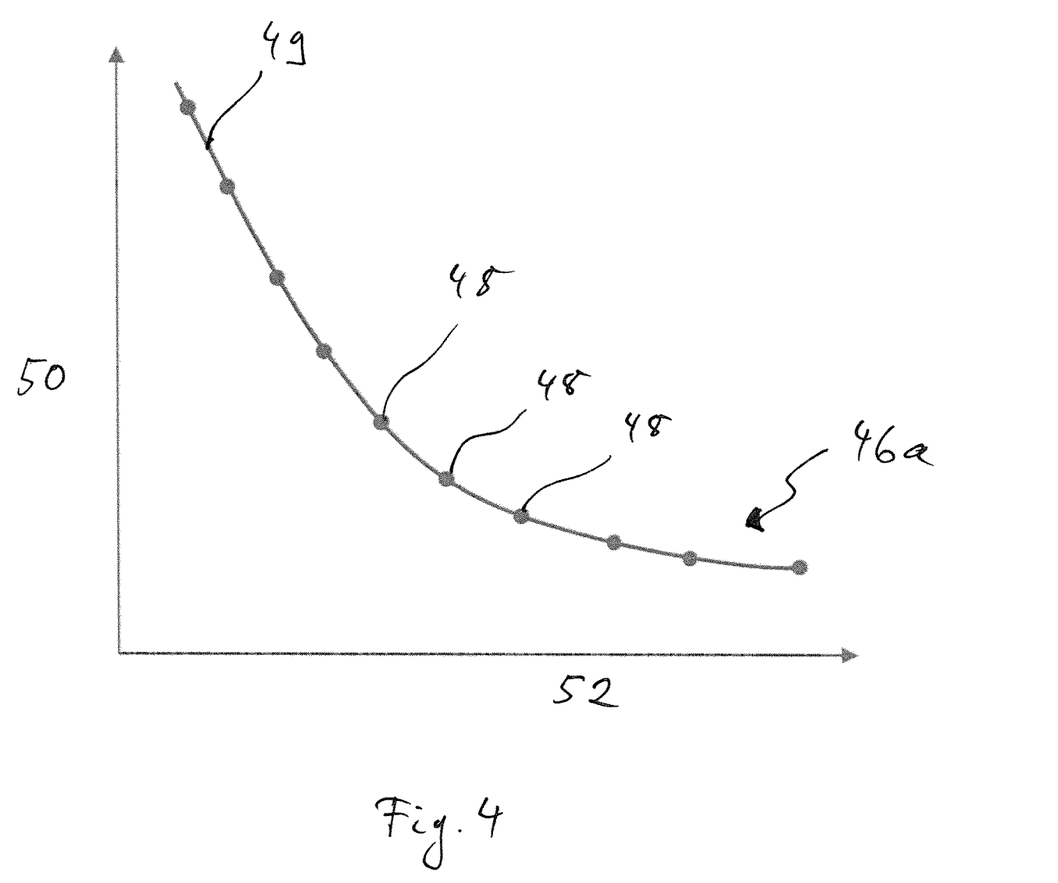
FIG. 4 shows a transfer function of an optoelectronic apparatus.

A detail of a transfer function 46a that comprises a plurality of functional values 48 is shown in FIG. 4. The transfer function 46a can only comprise a few functional values 48 (as shown) or a larger number of functional values 48 that lie on the interpolated curve 49 shown and that can e.g. be acquired by means of interpolation on the basis of the plurality of functional values 48. The transfer function 46a can also comprise a complete mathematical description of the curve 49. The transfer function 46a describes a relationship between a relative intensity 50 ("Y axis") of an optical signal received by an optoelectronic receiver 24 and the spacing 52 ("X axis") of an object 44 from which the optical signal has been reflected. In this respect, the relative intensity 50 represents a first operating parameter and the object distance 52 represents a second operating parameter of the apparatus 10.

Figure 5:
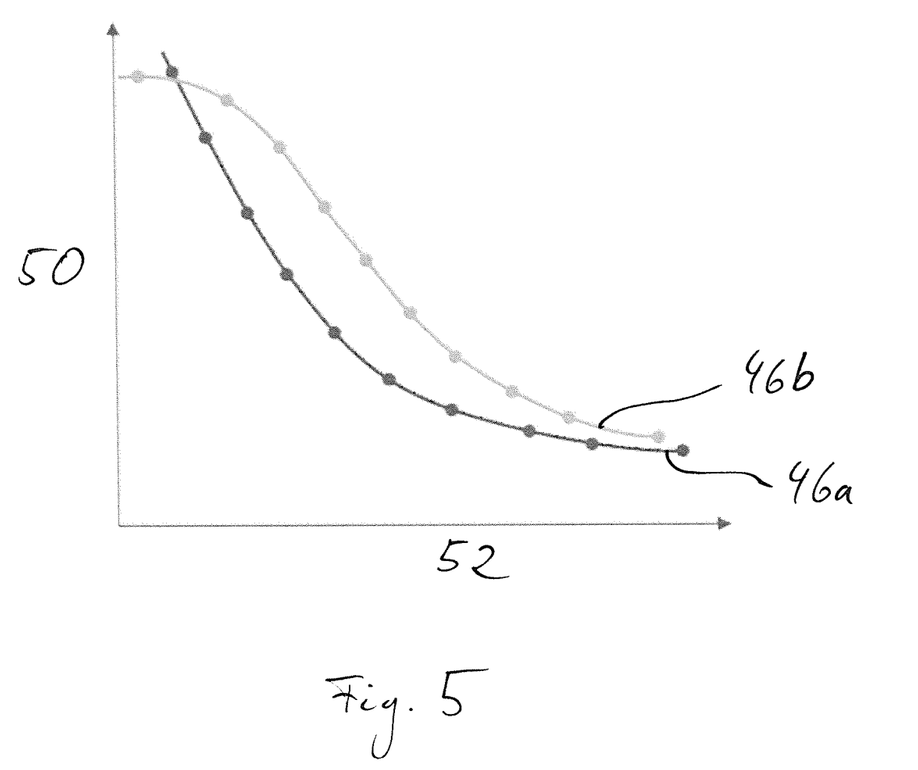
FIG. 5 shows the transfer function of FIG. 4 and a further transfer function of an optoelectronic apparatus.

FIG. 5 shows the transfer function 46a of FIG. 1 and a further transfer function 46b that differs from the transfer function 46a. The transfer function 46b relates to substantially the same sensor application as the transfer function 46a, but with a slightly different object (not shown) and within a slightly different range of object distances. Depending on the intended application of the apparatus 10, the apparatus 10 can be operated on the basis of one of the two transfer functions 46a, 46b in accordance with an underlying specification of the apparatus 10.

Figure 6:
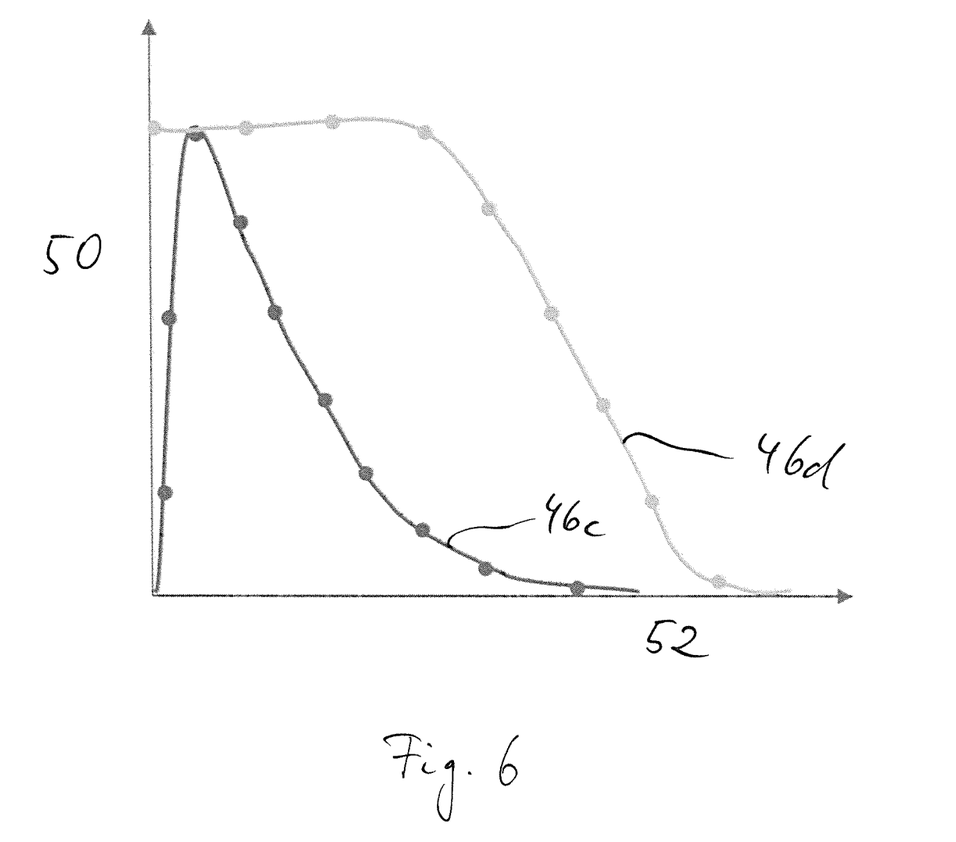
FIG. 6 shows two further transfer functions of an optoelectronic apparatus.

FIG. 6 shows two further transfer functions 46c and 46c for a further sensor application of the apparatus 10. The transfer functions 46c, 46d differ substantially from one another so that the apparatus 10 can be operated very differently while taking account of the transfer functions 46c, 46d. Operating parameters such as an amplification factor to be used for a signal received by the optoelectronic receiver 24 can be set simply in dependence on the respectively selected transfer function 46d, 46d so that the application-specific and apparatus-specific differences can be compensated.

Figure 7:
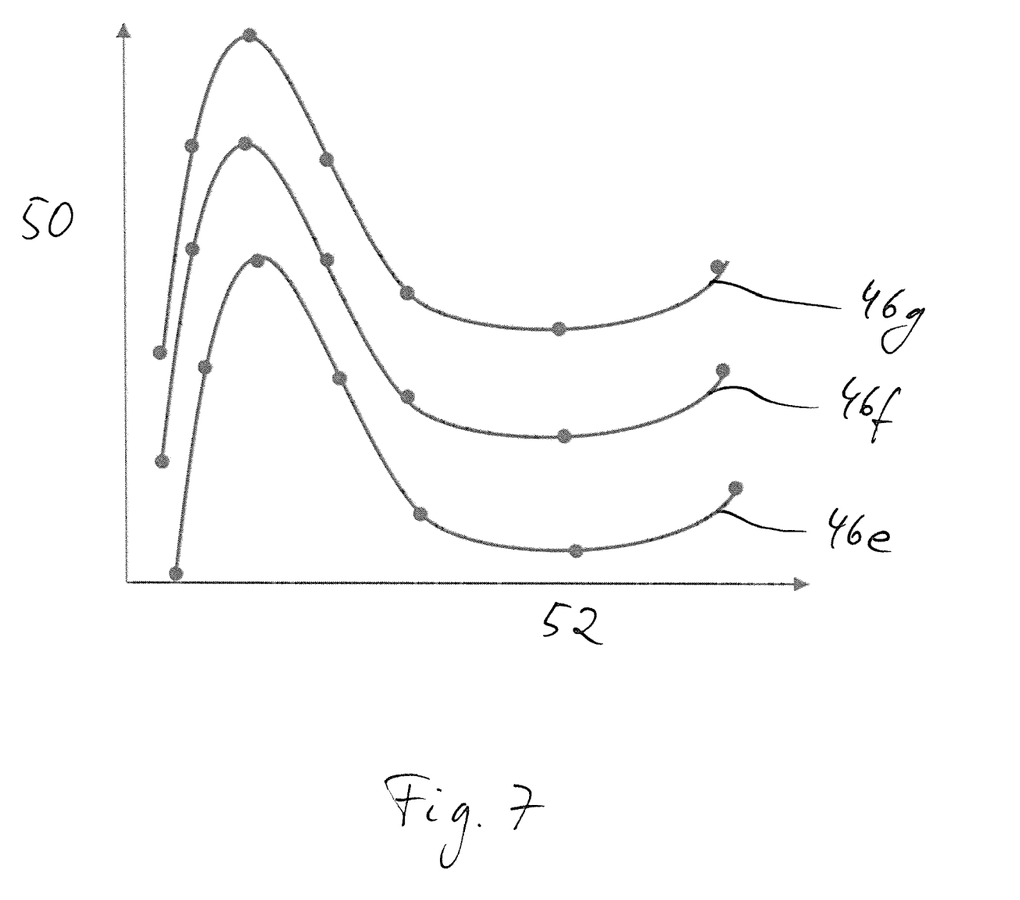
FIG. 7 shows three further transfer functions of an optoelectronic apparatus.

Three further transfer functions 46e, 46f and 46g are shown in FIG. 7, with the transfer functions 46e, 46f and 46g respectively relating to the detection of different objects 44. Since the transfer functions 46e, 46f and 46g each only differ from one another in a respective offset of the relative intensity 50, it is advantageous only to store one of the transfer functions 46e, 46f, 46g and a calculation rule for determining the other transfer functions 46e, 46f, 46g in the memory 30 of the apparatus 10. Where required, the associated transfer function 46e, 46f or 46g can be simply and efficiently determined in dependence on a respective object 44. This can in particular take place by means of a look-up table stored in the memory 30. Alternatively, polynomial functions can also be used for describing one or more transfer functions 46e 46f, 46g.

It is understood that still further individual data of the optoelectronic apparatus 10, in particular the kinds of data described generally above, can be stored in the memory 30; for example, information relating to the production history of the respective apparatus 10. The individual data set can thus provide a comprehensive "electronic ID" of the apparatus 10 by which the apparatus 10 can also be operated reliably and precisely in the event of significant manufacturing tolerances or in applications that differ greatly. If malfunctions nevertheless occur in individual cases. they can be diagnosed with the aid of the individual data set and can optionally be monitored by an individual update of the apparatus 10.

REFERENCE NUMERAL LIST 10 optoelectronic apparatus
12 carrier device
14 aperture element
16 lens element
18 lower part
20 upper part
22 optoelectronic transmitter
24 optoelectronic receiver
26 application-specific integrated circuit
28 logical calculating unit
30 non-volatile memory
32 voltage regulation
34 power source
36 bus module
38 temperature sensor
40 signal amplifier
42 analog-to-digital converter
44 object
46 transfer function
48 functional value
49 curve
50 relative intensity
52 object distance

The invention claimed is:

1. An optoelectronic apparatus, comprising:
at least one optoelectronic transmitter and at least one optoelectronic receiver;
a storage device having at least one non-volatile memory that is adapted to store an individual data set; and
a data interface that allows an access to the non-volatile memory;
wherein the individual data set comprises at least one transfer function describing a relationship between at least one first operating parameter and at least one second operating parameter of the optoelectronic apparatus, the operating parameters comprising optical or electrical properties of the optoelectronic apparatus.

2. The optoelectronic apparatus in accordance with claim 1, wherein the individual data set comprises a plurality of individual data.

3. The optoelectronic apparatus in accordance with claim 1, wherein the individual data set represents one of a spectral sensitivity characteristic of the optoelectronic apparatus, a distance-dependent sensitivity characteristic of the optoelectronic apparatus, and an angle-dependent sensitivity characteristic of the optoelectronic apparatus.

4. The optoelectronic apparatus in accordance with claim 1, wherein the individual data set comprises identification data on a production history of the optoelectronic apparatus, with the identification data comprising at least one of: at least one part number, at least one lot number and at least one piece of information on a production time.

5. The optoelectronic apparatus in accordance with claim 1, wherein the individual data set comprises production process data on a production history of the optoelectronic apparatus, with the production process data comprising at least one: at least one piece of information on a tool used in the manufacture, at least one piece of information on a test device used in the manufacture and at least one piece of information on test software used in the manufacture.

6. The optoelectronic apparatus in accordance with claim 1, wherein the first operating parameter corresponds to a ratio of a received signal of the optoelectronic receiver to an emission signal of the optoelectronic transmitter.

7. The optoelectronic apparatus in accordance with claim 1, wherein the individual data set has at least one of a look-up table for describing the at least one transfer function and polynomial parameters for characterizing a polynomial function.

8. The optoelectronic apparatus in accordance with claim 1, wherein the optoelectronic apparatus has an application-specific integrated circuit, with the storage device being connected to the application-specific integrated circuit or being integrated into the application-specific integrated circuit.

9. The optoelectronic apparatus in accordance with claim 8, wherein the application-specific integrated circuit is adapted to process and to output received signals of the optoelectronic receiver, with the application-specific integrated circuit further being adapted to read and output the individual data set or parts thereof out of the non-volatile memory but not being adapted to process the received signals of the optoelectronic receivers in dependence on the individual data set.

10. The optoelectronic apparatus in accordance with claim 1, wherein the optoelectronic apparatus further comprises a temperature sensor.

11. A method of manufacturing an optoelectronic apparatus, the method comprising:
providing at least one optoelectronic transmitter and at least one optoelectronic receiver;
providing a storage device having at least one non-volatile memory that is adapted to store an individual data set;
providing a data interface that allows an access to the non-volatile memory;
determining at least one of a spectral sensitivity characteristic, a distance-dependent sensitivity characteristic and an angle-dependent sensitivity characteristic of the optoelectronic apparatus; and
writing an individual data set to the non-volatile memory of the storage device, the individual data set representing the determined sensitivity characteristic, wherein
the individual data set is at least partly read out of the non-volatile memory of the storage device of the optoelectronic apparatus via the data interface of the optoelectronic apparatus,
the optoelectronic apparatus is operated in dependence on the read out individual data set, and
the read out individual data set comprises at least one transfer function, with the transfer function describing a relationship between at least one first operating parameter and at least one second operating parameter of the optoelectronic apparatus, the operating parameters comprising optical or electrical properties of the optoelectronic apparatus.

12. The method of manufacturing an optoelectronic apparatus in accordance with claim 11, wherein:
the optoelectronic apparatus is manufactured and tested in accordance with a production process, and
an individual data set is written to the non-volatile memory of the storage device in dependence on the production process and comprises at least one piece of information on a tool used in the manufacture and at least one of: at least one piece of information on a test device used in the manufacture and at least one piece of information on test software used in the manufacture.

13. The method of operating an optoelectronic apparatus in accordance with claim 11, wherein the transfer function relates to a predefined application of the optoelectronic apparatus as a sensor.

14. The method of operating an optoelectronic apparatus in accordance with claim 11, wherein the read out individual data set is checked for an update requirement, with the individual data set stored in the non-volatile memory of the storage device being updated via the data interface of the optoelectronic apparatus in dependence on a determined update requirement.

15. An optoelectronic sensor apparatus, comprising:
at least one optoelectronic transmitter and at least one optoelectronic receiver;
a storage device having at least one non-volatile memory that is adapted to store an individual data set;
a data interface that allows an access to the non-volatile memory; and
an application-specific integrated circuit, with the storage device being connected to the application-specific integrated circuit or being integrated into the application-specific integrated circuit,
wherein the application-specific integrated circuit is adapted to process and to output received signals of the optoelectronic receiver, and
wherein the individual data set represents at least one of: a spectral sensitivity characteristic of the optoelectronic apparatus, a distance-dependent sensitivity characteristic of the optoelectronic apparatus, and an angle-dependent sensitivity characteristic of the optoelectronic apparatus, with the application-specific integrated circuit further being adapted to read and output the individual data set or parts thereof out of the non-volatile memory but not being adapted to process the received signals of the optoelectronic receivers in dependence on the individual data set.

16. An optoelectronic apparatus, comprising:
a single-unit carrier device comprising:
at least one optoelectronic transmitter;
at least one optoelectronic receiver;
a storage device having at least one non-volatile memory that is adapted to store an individual data set; and
a data interface that allows an access to the non-volatile memory;
a lens element that is provided above the single-unit carrier device with respect to a vertical direction; and
a holding device that holds the single-unit carrier device and the lens element relative to one another and partly surrounds the single-unit carrier device and the lens element.

17. The optoelectronic apparatus in accordance with claim 16, wherein the individual data set represents one of a spectral sensitivity characteristic of the optoelectronic apparatus, a distance-dependent sensitivity characteristic of the optoelectronic apparatus, and an angle-dependent sensitivity characteristic of the optoelectronic apparatus.

18. The optoelectronic apparatus in accordance with claim 16, wherein the individual data set comprises identification data on a production history of the optoelectronic apparatus, with the identification data comprising at least one of: at least one part number, at least one lot number and at least one piece of information on a production time.

19. The optoelectronic apparatus in accordance with claim 16, wherein the individual data set comprises production process data on a production history of the optoelectronic apparatus, with the production process data comprising at least one: at least one piece of information on a tool used in the manufacture, at least one piece of information on a test device used in the manufacture and at least one piece of information on test software used in the manufacture.

20. The optoelectronic apparatus in accordance with claim 16, wherein the individual data set comprises at least one transfer function describing a relationship between at least one first operating parameter and at least one second operating parameter of the optoelectronic apparatus, the operating parameters comprising optical or electrical properties of the optoelectronic apparatus.

21. The optoelectronic apparatus in accordance with claim 16, wherein the single-unit carrier device has a flat shape, wherein the lens element has at least one flat lens section with beam-shaping or beam-deflecting properties, and wherein the single-unit carrier device and the lens element are assembled in a layered arrangement within the holding device.

* * * * *